US007604847B2

(12) United States Patent
Kawamoto et al.

(10) Patent No.: US 7,604,847 B2
(45) Date of Patent: Oct. 20, 2009

(54) METHOD FOR MANUFACTURING LIQUID CRYSTAL ALIGNMENT FILM, LIQUID CRYSTAL ALIGNMENT FILM, OPTICAL FILM AND IMAGE VIEWING DISPLAY

(75) Inventors: Ikuo Kawamoto, Ibaraki (JP); Takashi Kamijo, Ibaraki (JP); Hideyuki Yonezawa, Ibaraki (JP); Seiji Umemoto, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 413 days.

(21) Appl. No.: 11/193,378

(22) Filed: Aug. 1, 2005

(65) Prior Publication Data

US 2006/0024854 A1 Feb. 2, 2006

(30) Foreign Application Priority Data

Aug. 2, 2004 (JP) ............................ 2004-225790
Feb. 21, 2005 (JP) ............................ 2005-044035

(51) Int. Cl.
*B05D 1/04* (2006.01)
*B05D 5/12* (2006.01)

(52) U.S. Cl. ....................... 427/532; 427/154; 427/162; 427/164; 156/247; 428/1.2

(58) Field of Classification Search ................. 156/247; 428/1.61, 1.2, 355 RA, 355 EN, 40.1, 41.7, 428/41.8, 42.3; 349/122-123, 126; 427/164, 427/58, 154, 162, 299
See application file for complete search history.

(56) References Cited

U.S. PATENT DOCUMENTS 3,900,248 A * 8/1975 Nagasaki ..................... 349/81
4,309,814 A * 1/1982 Takamatsu et al. ......... 29/592.1
5,403,424 A * 4/1995 Ehrat et al. ................. 156/247
5,853,801 A 12/1998 Suga et al.
6,153,272 A * 11/2000 Kim et al. ..................... 428/1.5
6,478,918 B2 * 11/2002 Bennett et al. .............. 156/248
6,582,789 B1 * 6/2003 Sumi ......................... 428/40.1
7,214,424 B2 * 5/2007 Kiuchi et al. ............... 428/343
2002/0131000 A1 * 9/2002 Koike et al. ................. 349/126
2002/0167639 A1 * 11/2002 Coates et al. ............... 349/187
2003/0049294 A1 * 3/2003 Porchia et al. .............. 424/405
2003/0060350 A1 * 3/2003 Taylor et al. ................ 493/324
2003/0214059 A1 * 11/2003 Itoh ........................... 264/1.1

(Continued)

FOREIGN PATENT DOCUMENTS

CN 1497304 5/2004

(Continued)

OTHER PUBLICATIONS

Chinese Office Action dated Jun. 29, 2007, issued in corresponding Chinese Patent Application No. 200510088128.9.

*Primary Examiner*—David R Sample
*Assistant Examiner*—Sophie Hon
(74) *Attorney, Agent, or Firm*—Westerman, Hattori, Daniels & Adrian, LLP

(57) ABSTRACT

A method for manufacturing liquid crystal alignment film of the present invention comprises the steps of: (1) aligning a transparent substrate film by rubbing; (2) laminating a surface protective sheet having a release force of 0.5 N/50 mm or less onto an aligned face of the transparent substrate; (3) coating a liquid crystal material comprising a liquid crystal monomer and/or a liquid crystal polymer onto the aligned face after releasing the surface protective sheet; and (4) fixing the liquid crystal material after aligning the liquid crystal material. The method can make satisfactorily align the liquid crystal material on the substrate.

3 Claims, 1 Drawing Sheet

U.S. PATENT DOCUMENTS

2006/0177654 A1 * 8/2006 Shoshi ....................... 428/354

FOREIGN PATENT DOCUMENTS

| | | | |
|---|---|---|---|
| JP | 9-73081 | | 3/1997 |
| JP | H09-073081 | A | 3/1997 |
| JP | 2784680 | | 5/1998 |
| JP | 2003-089152 | A | 3/2003 |
| JP | 2003-147288 | A | 5/2003 |
| JP | 2003-177241 | A | 6/2003 |
| JP | 2003-287749 | | 10/2003 |
| JP | 2003-287749 | A | 10/2003 |
| WO | WO 2004083330 | A1 * | 9/2004 |

* cited by examiner

METHOD FOR MANUFACTURING LIQUID CRYSTAL ALIGNMENT FILM, LIQUID CRYSTAL ALIGNMENT FILM, OPTICAL FILM AND IMAGE VIEWING DISPLAY

BACKGROUND OF THE INVENTION

1. Field of the Invention

The present invention relates to a method for manufacturing liquid crystal alignment film. The present invention also relates to a liquid crystal alignment film obtained by the manufacturing method concerned, and an optical film comprising at least one of the liquid crystal alignment films concerned. The liquid crystal alignment film of the present invention may be used as optical films, such as retardation plates, viewing angle compensating films, optical compensating film, and elliptically polarizing film, independently, or in combination with other films. Furthermore, the present invention relates to an image viewing display, such as liquid crystal displays, organic electro luminescent displays, and PDPs, comprising the optical films.

2. Description of the Related Art

Recently, in optical fields, optical electronics fields etc., retardation plates for controlling a phase of light is one of important optical elements. In addition, elliptically polarizing plates can be obtained by laminating retardation plates to polarizing plates, and various configurations have been discussed in relation to retardation values, wavelength dispersion etc. of the retardation plates.

Conventionally, retardation plates have been manufactured by uniaxial stretching or biaxial stretching of polymer films. For example, polycarbonate resins may be mentioned as materials of polymer films, but the resins have large wavelength dispersion and give higher retardation in shorter wavelength side. Alternatively, there have been used retardation plates using norbornene based resins having smaller wavelength dispersion, and modified polycarbonate resins having higher retardation in longer wavelength side. These retardation plates are used by lamination with various axial angles. However, as compared with polycarbonate resins, norbornene based resins and modified polycarbonates give higher costs. The materials laminated therewith result in still higher costs. It is necessary for these laminated materials to be punched with various degrees of axial angle and to be used in a form of a single plate for laminate, therefore higher process costs and period to be need, leading to cause deterioration.

On the other hand, as retardation plates, liquid crystal alignment layers formed on alignment substrates have been known. The liquid crystal alignment layers are obtained by a method coating solution crystal materials, such as liquid crystal monomers or liquid crystal polymers, on alignment substrates and aligning uniformly, and then curing (Refer to Japanese Patent No. 2784680 specification). Liquid crystal materials include rod-like nematic liquid crystals, disk-like discotic liquid crystals, etc., and also include various kinds according to wavelength dispersion characteristics as in retardation plates using stretched films. As to substrates for alignment, stretched polymer films and rubbing alignment layers may be mentioned.

In the case of aligning a liquid crystal material on a stretched polymer film, precision in an axial direction of the stretched polymer film are necessary. However, in stretched polymer films manufactured by conventional method of longitudinal stretching and transverse stretching, it is hard to cheaply and stably obtain precision in an axial direction of not less than ±1 degrees in a width direction. For this reason, stretched polymer films may be used as alignment substrates of C-plates that satisfies "nz>nx≈ny" or "nx≈ny>nz", where refractive indexes in a plane of C-plate are defined as nx and ny, and a refractive index in a thickness direction is defined as nz, and cholesteric liquid crystals, without necessity of precision in an axial direction. However the stretched polymer films have difficulty in use for manufacturing of A-plates that satisfies "nx<ny≈nz" or "nx>ny≈nz", with necessity of precision in an axial direction. On surfaces of rubbing alignment layers, contamination given before coating of liquid crystal materials reduced alignment of liquid crystal materials, and thus was difficult to obtain liquid crystal alignment layer with excellent alignment. For example, alignment of liquid crystal materials will be reduced by contact of rubbing alignment layer surfaces to rolls etc. before coating process of liquid crystal materials after rubbing treatment of substrate films. Therefore, methods for manufacturing liquid crystal alignment films using rubbing alignment layers have had difficulty in introduction of continuous production with a roll to roll system.

SUMMARY OF THE INVENTION

It is an object of the present invention to provide a method for manufacturing liquid crystal alignment film that liquid crystal materials can be satisfactorily aligned on a substrate treated for alignment by rubbing.

It is an another object of the present invention to provide a liquid crystal alignment film obtained by the manufacturing method, an optical film comprising the liquid crystal alignment film, and an image viewing display comprising the optical film.

As a result of wholehearted investigation performed by the present inventors, it was found out that the method for manufacturing liquid crystal alignment film described below might solve the above-described problems, leading to completion of the present invention.

That is, the invention is related to a method for manufacturing liquid crystal alignment film comprising the steps of:

(1) aligning a transparent substrate film by rubbing;

(2) laminating a surface protective sheet having a release force of 0.5 N/50 mm or less onto an aligned face of the transparent substrate;

(3) coating a liquid crystal material comprising a liquid crystal monomer and/or a liquid crystal polymer onto the aligned face after releasing the surface protective sheet; and (4) fixing the liquid crystal material after aligning the liquid crystal material.

The method for manufacturing liquid crystal alignment film of the present invention has a lamination step (2) of a surface protective sheet to an aligned face having rubbing treatment performed thereto after a rubbing aligning step (1) and before a coating step (3) of a liquid crystal material. Thus, this aligned face having rubbing treatment performed thereto will come into contact with no other materials until just before coating of the liquid crystal material. Therefore, the aligned face can suppress deterioration of alignment caused by contamination, and can align the liquid crystal material, while maintaining excellent alignment. As a result, the method enables continuous production of a liquid crystal alignment film having slow axis, which is arbitrary determined with respect to a longitudinal direction of the film, using the roll to roll method without deterioration of alignment of the liquid crystal material. This method enables inexpensive production of a liquid crystal alignment film usable to a thin retardation plate adaptable to larger-sized plates. A method for manufacturing liquid crystal alignment film of the present invention is applicable to a method for manufacturing of various kinds of retardation plates, and is suitable for manufacturing a retardation plate, such as A-plate that especially needs accuracy and precision in axial direction.

A surface protective sheet used for the step (2) has a release force of 0.5 N/50 mm or less. This release force represents a force (N/50 mm) in releasing of a surface protective sheet, with respect to a triacetyl cellulose film in 180-degree peel at a speed of 300 mm/min. Specifically, the release force is measured by a method as shown in Examples. A release force of the surface protective sheet exceeding 0.5 N/50 mm disturbs alignment on the rubbing treatment face, and reduces alignment of the liquid crystal material by releasing of the surface protective sheet. The release force is preferably 0.5 N/50 mm or less, and is more preferably 0.3 N/50 mm or less. From a viewpoint of protective function of the aligned face with the surface protective sheet, the release force is preferably 0.03 N/50 mm or more, and more preferably 0.05 N/50 mm or more.

In the above method for manufacturing liquid crystal alignment film, the surface protective sheet preferably comprises a base material layer and a pressure-sensitive adhesive layer, and the surface protective sheet is manufactured by co-extrusion of the pressure-sensitive adhesive layer and the base material layer or by coating the pressure-sensitive adhesive layer to the base material layer. The base material layer preferably comprises an olefin based resin, and the pressure-sensitive adhesive layer comprised an ethylene-vinyl acetate copolymer.

In the method for manufacturing liquid crystal alignment film, wherein the transparent substrate film is uniformly charged either positive or negative at the time of releasing the surface protective sheet in the step (3). Uniform electrification of a transparent substrate film with either of positive or negative charge at the time of releasing of a surface protective sheet indicates that alignment on the rubbing aligned face is maintained. It can be identified whether the face is uniformly charged with either of positive or negative electric charge, by spraying of colored metal powders, for example, toners having different colors by electrifications, respectively, charged in positive or negative.

The present invention is also related to a liquid crystal alignment film obtained by the above method for manufacturing liquid crystal alignment film.

The present invention is also related to an optical film comprising at least one of the above liquid crystal alignment films. The liquid crystal alignment film is thin and has uniform retardation, and may suitably be used as a retardation plate etc. In addition the liquid crystal alignment film (retardation plate) may conveniently be used for elliptically polarizing plates etc. in combination with polarizing plates.

The present invention is also related to an image viewing display comprising the above optical film.

The present invention is further related to a surface protective sheet having a release force of 0.5 N/50 mm or less used in the step (2) in the above method for manufacturing liquid crystal alignment film.

DESCRIPTION OF THE PREFERRED EXAMPLES

Figure 1:
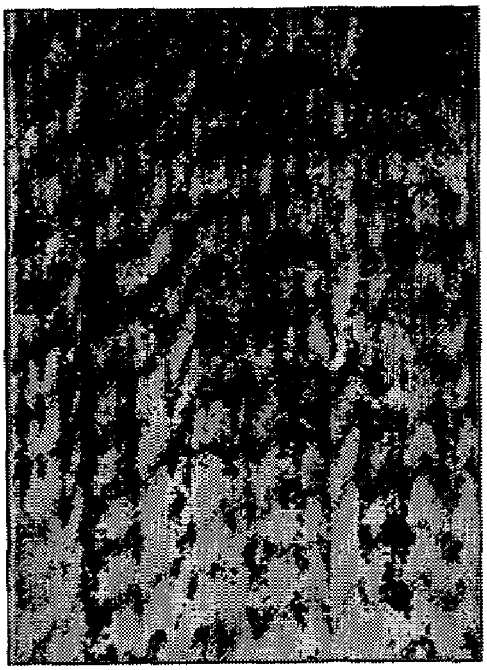
FIG. 1 shows a photograph concerning color distribution of attached toner showing electrified state in Example 1.

Stepwise description for each process will, hereinafter, be given about a method for manufacturing liquid crystal alignment film of the present invention.

(Step (1))

In step (1), aligning of a transparent substrate film is carried out by rubbing.

<Transparent Substrate Film>

Transparent substrate films are not especially limited, if they are substrate films that do not give any change in quality at an alignment temperature of the liquid crystal materials, and, for example, various plastic films, glass plates, metals etc. having a mono-layered structure or multi-layered structure may be used. Plastic films are not especially limited, and films comprising transparent polymers, for example, polyester based polymers, such as polyethylene terephthalates and polyethylene naphthalates; cellulose based polymers, such as diacetyl celluloses and triacetyl celluloses; polycarbonate based polymers; acrylic based polymers, such as polymethylmethacrylates may be mentioned. And also, films comprising transparent polymers, for example, styrene based polymers, such as polystyrenes, and acrylonitrile styrene copolymers; olefin based polymers, such as polyethylenes, polypropylenes, polyolefins having cyclic or norbornene structure, ethylene propylene copolymers; vinyl chloride based polymers; amido based polymers, such as nylons and aromatic polyamides may be mentioned. Furthermore, films comprising transparent polymers, for example, imido based polymers, sulfone based polymers, polyether sulfone based polymers, polyether ether ketone based polymers, polyphenylene sulfide based polymers, vinyl alcohol based polymers, vinylidene chloride based polymers, vinyl butyral based polymers, allylate based polymers, polyoxymethylene based polymers, and epoxy based polymers, and mixtures of the above described polymers may also be mentioned. As to the transparent substrate films, triacetyl cellulose films, norbornene based resin films and olefin based films are preferable.

Moreover, as to the transparent substrate film, polyvinyl alcohol based thin films, polyimide based thin films, polysiloxane based thin films, and glassy macromolecule thin films may be provided for use.

As materials for forming the glassy macromolecule thin film, metal alkoxides, especially metal silicon alkoxide sols may preferably be used. The metal alkoxides are usually used as a solution of an alcoholic solvent. After coating of the solution to a substrate film, the solvent is removed, then heated to promote a sol-gel reaction, leading to formation of a transparent glassy macromolecule film on the substrate film. A metal silicon alkoxide gel layer is formed from a metal silicon alkoxide sol. As methods for coating the metal alkoxide sol solution on the substrate, for example, a roll coating method, a photogravure coating method, a bar coating method, etc. may be employable. As methods for solvent removing and promoting reaction, a drying method at room temperature, a drying method with in oven, etc. may usually be utilized.

The rubbing treatment is performed by rubbing a face of a substrate film using cloths comprising fine fibers, such as cotton or rayon, or leather material, for aligning. In this treatment, adoptable is a method of rubbing wherein the face is rubbed in one direction manner with a rubbing roller having the cloths or leather material wound thereon. This rubbing roller can change a degree of axial angle in a direction of 0 degrees to ±45 degrees to perform rubbing. Thus, the liquid crystal alignment films having various optical axes, which obtained by using the rubbing treatment substrate with varied degree of axial angle, are useful as retardation plates (compensation plates).

(Step (2))

In the step (2), a surface protective sheet having a release force of 0.5 N/50 mm or less is laminated onto the aligned face of the transparent substrate;

When a release force of 0.5 N/50 mm or less is satisfied, a surface protective sheet will not be limited in particular, and it may be formed of one layer, or may be formed of two or more layers. In a surface protective sheet formed of one layer, the one layer concerned satisfies a release force of 0.5 N/50 mm or less. On the other hand, in a surface protective sheet formed of two or more layers, at least one layer is a base material layer, and at least one layer is a pressure-sensitive adhesive layer. The pressure-sensitive adhesive layer side is attached onto the aligned face.

Descriptions about surface protective sheets having a base material layer and a pressure-sensitive adhesive layer will, hereinafter, be given. Although a method for forming a surface protective sheet having a base material layer and a pressure-sensitive adhesive layer is not limited in particular, film formation of the base material layer and the pressure-sensitive adhesive layer is preferably performed by a co-extrusion method. As to co-extrusion methods, methods according to an inflation process, a T-die method, etc. generally used to film production etc. are employable. In addition to the methods, also employable is a method wherein a surface protective sheet is formed by coating or transferring a pressure-sensitive adhesive layer onto a base material layer.

Examples of materials for forming a base material layer include olefin based resins. Olefin based resins include olefin homopolymers, and copolymerized resins comprising a plurality of olefins and other monomers, such as block polymers and random polymers. Specifically, the olefin based resins include: olefin based polymers, such as propylene based polymers, low density polyethylenes, high density polyethylenes, medium density polyethylenes, linear low density ethylene polymers etc., ethylene propylene copolymers, ethylene-alpha-olefin copolymers, and reactor TPO; and olefin based copolymers obtained by olefins and other monomers, such as ethylene methyl methacrylate copolymers.

For the purpose of prevention of deterioration etc., antioxidants, and light stabilizers, such as ultraviolet absorbers and hindered amine based light stabilizers, may be added to the base material. Antistatic agents, and furthermore, for example, fillers, such as calcium oxide, magnesium oxide, silica, zinc oxide and titanium oxide, and proper additives, such as pigments, gumming inhibitors, lubricants, and anti blocking agents may also be blended.

A thickness of the base material layer is generally, but not limited to, 20 to 300 μm, preferably 30 to 250 μm, and more preferably 40 to 200 μm.

As to resins for forming the pressure-sensitive adhesive layers, ethylene-vinyl acetate copolymers are preferable. In addition, as materials forming the pressure-sensitive adhesive layers, for example, publicly known pressure-sensitive adhesives, such as rubber material based, acrylic, and urethane based adhesives may be mentioned. Examples of rubber material based polymers include polymers having as base polymers: diene based polymers, such as natural rubbers, polyisobutylenes, butyl rubbers, polyisoprenes, polybutadienes, and hydrogenated polymers thereof; olefin based rubber materials, such as ethylene propylene rubbers, ethylene-α-olefins, ethylene-propylene-α-olefins, and propylene-α-olefins; A-B-A type block polymers, such as styrene butadiene styrene (SBS), styrene isoprene styrene (SIS), styrene ethylene-butylene styrene (SEBS), styrene ethylene-propylene styrene (SEPS) etc.; A-B type block copolymers, such as styrene butadiene (SB), styrene isoprene (SI), styrene ethylene-butylene copolymers (SEB), styrene ethylene-propylene copolymers (SEP), etc.; styrene based random copolymers, such as styrene butadiene rubbers (SBR); A-B-O type styrene olefin crystalline block polymers, such as hydrogenated styrene based random copolymers (HSBR), styrene ethylene-butylene copolymer olefin crystals (SEBC), etc.; C-B-C type olefin crystal based block polymers, such as olefin crystalline-ethylene/butylene copolymer-olefin crystalline (CEBC) etc.

In formation of pressure-sensitive adhesive layers, suitable additives may be blended, if necessary, for the purpose of control of pressure-sensitive adhesive property etc., and examples of the additives includes: softeners, olefin based resins, silicone based polymers, liquefied acrylic copolymers, phosphate based compounds, tackifiers, antioxidants, hindered amine based light stabilizers, ultraviolet absorbers, and furthermore fillers, such as calcium oxide, magnesium oxide, silica, zinc oxide, and titanium oxides.

A thickness of the pressure-sensitive adhesive layers may be suitably determined corresponding to release forces etc., and in general it is 1 to 50 μm, preferably 2 to 40 μm, and more preferably 5 to 20 μm. Pressure-sensitive adhesive layers may also be protected by temporary lamination of separators etc. until practical use, if necessary.

The surface protective sheet is laminated onto the aligned face, and in order to prevent contamination of the aligned face, it is preferable to succeeding perform lamination immediately after the step (1).

(Step (3))

In the step (3), after releasing the surface protective sheet, a liquid crystal material including a liquid crystal monomer and/or a liquid crystal polymer is coated onto the aligned face.

In order to prevent contamination of the aligned face, releasing of the surface protective sheet is preferably performed immediately before coating of the liquid crystal material. Although releasing methods of the surface protective sheet is not limited in particular, releasing is preferably performed at fixed speed so that alignment of the aligned face may not be impaired. For example, a releasing is preferably to be performed by 180-degree peel method. Since the surface protective sheet having a release force 0.5%/50 mm or less is used in the present invention, the aligned face of the transparent substrate film after releasing of the surface protective sheet may be either positively or negatively charged.

The liquid crystal material includes a liquid crystal monomer or a liquid crystal polymer, or mixtures thereof.

A liquid crystal monomer is a liquid crystalline compound that has various structures showing nematic, cholesteric, or smectic liquid crystal alignment, and that has at least one of polymerizable functional group, for example, unsaturated double bonds, such as acryloyl groups, metacryloyl groups, and vinyl groups, and epoxy groups at terminal groups. Among these liquid crystal monomers, preferably used are liquid crystalline compounds having at least one unsaturated double bond, such as acryloyl group or methacryloyl group, and also having nematic liquid crystallinity. In order to have improved durability, the liquid crystal monomer having two or more photopolymerizable functional groups is preferable. Specifically, such liquid crystal monomers include monomers represented by following formula (1). These liquid crystal monomers may be used independently, or two or more kinds may be used in combination.

[Formula 1]

(1)

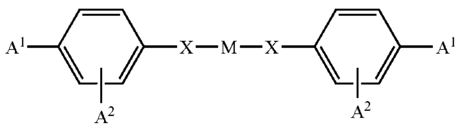

In the formula (1), $A^1$ and $A^2$ represent polymerizable groups, respectively, and they may be identical or may be different from each other. And, either of $A^1$ and $A^2$ may be hydrogen, X represents single bond, —O—, —S—, —C═N—, —O—CO—, —CO—O—, —O—CO—O—, —CO—NR—, —NR—CO—, —NR—, —O—CO—NR—, —NR—CO—O—, $—CH_2—O—$, or —NR—CO—NR, respectively. R in the X represents H or $C_1$ to $C_4$ alkyl, and M represents a mesogen group.

In the formula (1), although two of X may be identical or may be different from each other, they are preferably identical. Two of $A^2$ in the monomer of the formula (1) are preferably bonded at ortho position with respect to corresponding $A^1$, respectively.

The $A^1$ and $A^2$ are preferably independently represented with following formula (2), respectively: $Z\text{-}X\text{-}(Sp)_n$ . . . (2) and $A^1$ and $A^2$ are preferably identical group each other.

In the formula (2), Z represents a cross-linking group, designations for X is identical as in the formula (1), Sp represents a spacer containing of linear or branched alkyl group having C atoms of 1 to 30, and n represents 0 or 1. A carbon chain in the Sp, for example, may contain oxygen in ether functional group, sulfur in thio-ether functional group, non-adjacent imino group or alkyl imino group having $C_1$ to $C_4$ etc.

In the formula (2), Z preferably is either of atomic groups represented with following formula. In the following formula, for example, R includes, groups, such as methyl, ethyl, n-propyl, i-propyl, n-butyl, i-butyl, and t-butyl.

[Formula 2]

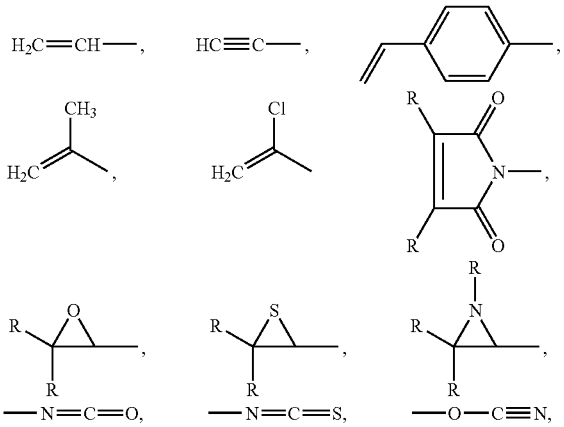

In the formula (2), Sp preferably is either of atomic groups represented with following formula. In the following formula, m is preferably 1 to 3 and p is 1 to 12.

[Formula 3]

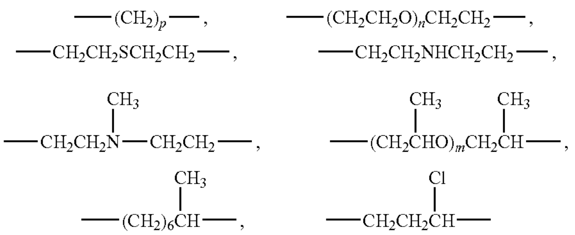

In the formula (1), M is preferably represented with following formula (3), and in the following formula (3), designations for X is identical as in the formula (1). Q, for example, represents a substituted, or non-substituted alkylene or aromatic hydrocarbon atomic group, and for example, it may be a substituted, or non-substituted linear, or branched $C_1$ to $C_{12}$ alkylene, etc.

[Formula 4]

(3)

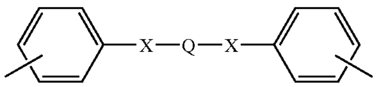

When the Q is an aromatic hydrocarbon atomic group, for example, it is preferably one of atomic groups represented with following formulas, or of substituted analogs thereof.

[Formula 5]

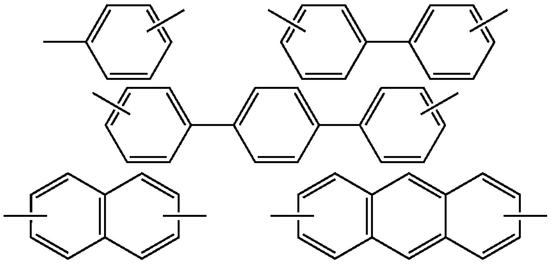

The substituted analog of the aromatic hydrocarbon atomic group represented with the formula may have, for example, 1 to 4 substituted groups per one aromatic ring, and may have one or two substituted groups per one of the aromatic ring or one group. The substituted groups may be identical with each other, may be different from each other. As the substituted groups, for example, $C_1$ to $C_4$ alkyls, nitro, halogens, such as, F, Cl, Br, and I, and phenyl, $C_1$ to $C_4$ alkoxyls etc. may be mentioned.

As examples of the liquid crystal monomer, for example, monomers represented with following formula (4) to (19) may be mentioned.

[Formula 6]
(4)
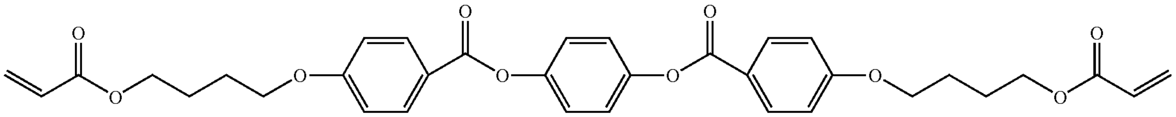
(5)
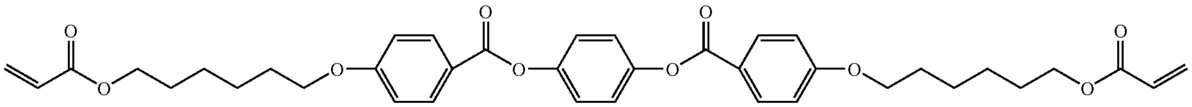
(6)
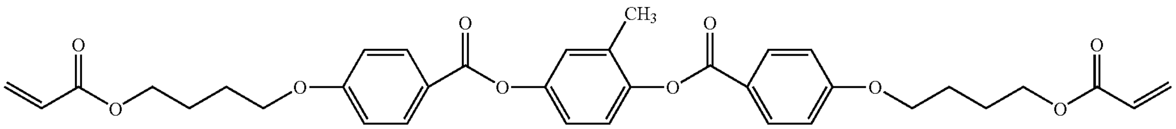
(7)
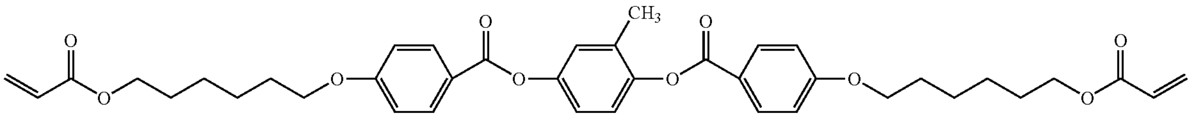
(8)
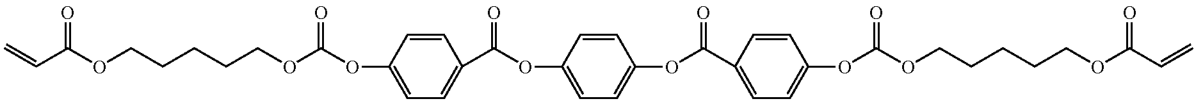
(9)
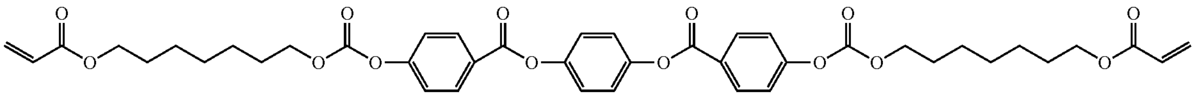
(10)
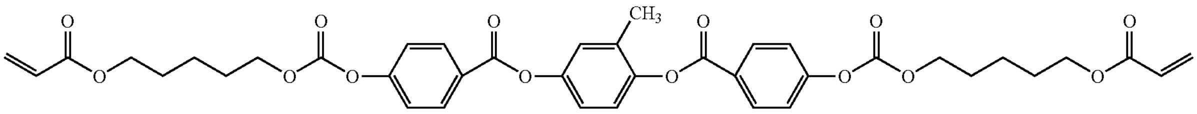
(11)
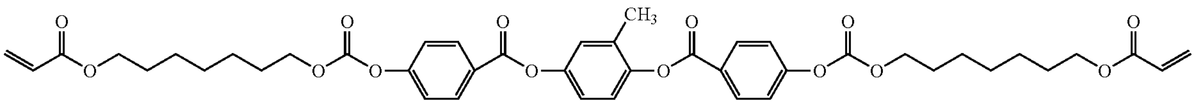
(12)
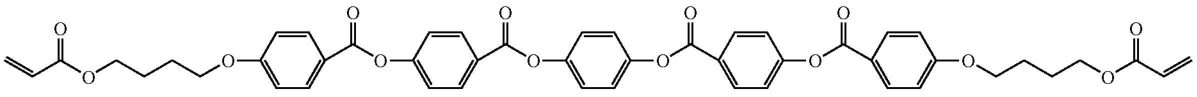
(13)
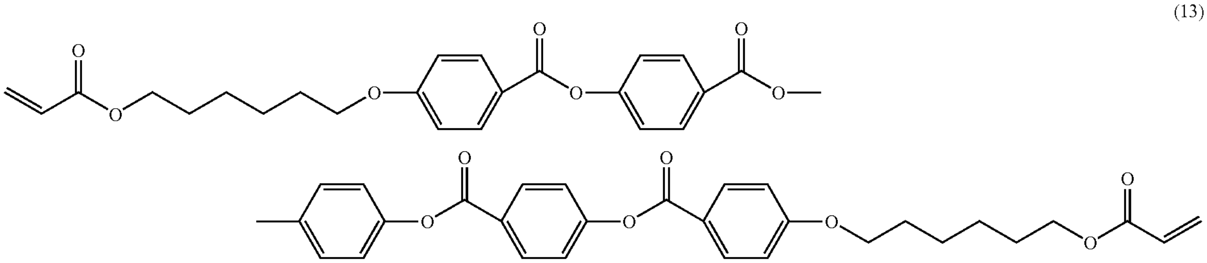

-continued (14)

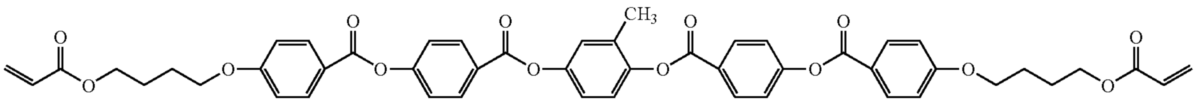

(15)

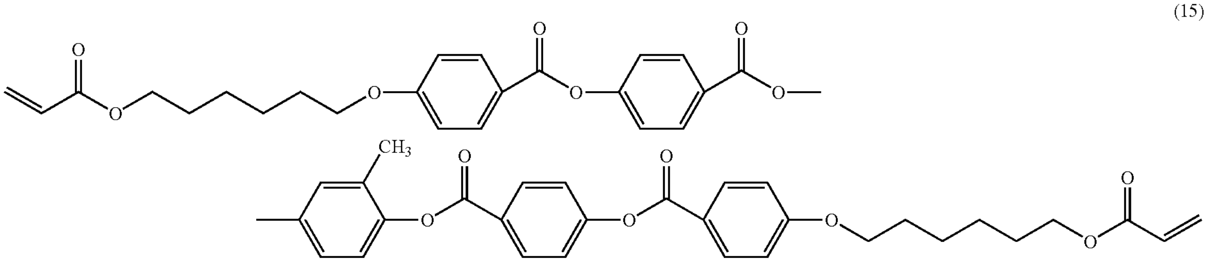

Temperature ranges in which the liquid crystal monomer shows liquid crystallinity vary based on a kind thereof, and for example, preferably it is in a range of 40 to 120° C., more preferably in a range of 50 to 100° C., and particularly preferably in a range of 60 to 90° C.

Liquid crystal monomers usually include polymerization initiators therein. A suitable polymerization initiator is selected depending on a polymerization method of liquid crystal monomer. As a polymerization method of the liquid crystal monomer, for example, ultraviolet radiation polymerization may be mentioned, which uses photopolymerization initiators. As photopolymerization initiators, for example, Irgacure 907, Irgacure 184, Irgacure 651, and Irgacure 369 etc. manufactured by Ciba Specialty Chemicals may be illustrated. As an amount of addition of photopolymerization initiators, an amount that does not disturb alignment property may be used in consideration of kinds of liquid crystal monomers etc. Usually, approximately 0.5 to 30 parts by weight is preferable to liquid crystal monomers 100 parts by weight. Especially it is more preferable 2 to 7 parts by weight, further more preferable 3 to 6 parts by weight.

As a liquid crystal polymer, polymers having various structures, such as principal chain type, side chain type, or compound type thereof showing liquid crystal alignment property of nematic, cholesteric, or smectic property may be used without any limitation.

Principal chain type liquid crystal polymers include polymers of condensed type having a structure where mesogenic groups comprising aromatic units etc. are bonded, such as polyester based, polyamide based, polycarbonate based and polyester imide based polymers. As the above described aromatic units constituting mesogenic groups, phenyl based, biphenyl based, and naphthalene based units may be mentioned, and these aromatic units may have substituents, such as cyano groups, alkyl groups, alkoxy groups, and halogen groups.

Side chain type liquid crystal polymers include types having principal chain of polyacrylate based, polymethacrylate based, polysiloxane based, and polymalonate based chain as a structure, and has mesogenic groups comprising cyclic units etc. as side chains. As the above described cyclic units used as mesogenic groups, biphenyl based, phenyl benzoate based, phenylcyclohexane based, azoxybenzene based, azomethine based, azobenzene based, phenyl pyrimidine based, diphenyl acetylene based, diphenyl benzoate based, bicyclo hexane based, cyclohexylbenzene based, terphenyl based units, etc. may be mentioned. Moreover, end groups of these cyclic units may have substituents, such as cyano groups, alkyl groups, alkoxy groups, and halogen groups.

And, any mesogenic groups in a liquid crystal polymer may be bonded through spacer parts that give flexibility. As spacer parts, polymethylene chains, polyoxymethylene chains, etc. may be mentioned. A number of repetitions of structural units forming the spacer parts is suitably determined by chemical structures of mesogenic parts, and a number of repetition units of polymethylene chain is 0 to 20, and preferably 2 to 12, and a number of repetition units of polyoxymethylene chain is 0 to 10, and preferably is 1 to 3.

Moreover, cholesteric based liquid crystal polymers may be obtained by adding low molecule chiral agents to nematic based liquid crystal polymers, or by introducing chiral components into polymer components.

A molecular weight of a liquid crystal polymer is not especially limited, and approximately 2,000 to 100,000 of weight average molecular weight is preferable. Since decrease in alignment property as a liquid crystal will be shown when a weight average molecular weight of a liquid crystal polymer becomes large, a weight average molecular weight of the liquid crystal polymer is more preferably 50,000 or less. On the other side, since a tendency is shown that film-forming property as a non-fluid layer becomes inferior when a weight average molecular weight of the liquid crystal polymer becomes smaller, a weight average molecular weight of the liquid crystal polymer is more preferably 2,500 or more.

A liquid crystal material comprise the above described liquid crystal monomers, the liquid crystal polymers or a mixture thereof. As to coating methods of the liquid crystal material onto the aligned face, a solution coating method using a solution in which the liquid crystal material is dissolved in solvents, or a method in which the concerned is molten, and is coated in a molten state may be mentioned, and the solution coating method is preferable among them.

Solvents used when preparing the above described solution are suitably determined depending on kinds of the liquid crystal materials and the transparent substrate films. For example, following solvents may usually be used: halogenated hydrocarbons, such as chloroform, dichloromethane, dichloroethane, tetrachloroethane, trichloroethylene, tetrachloroethylene, and chlorobenzene; phenols, such as phenol and para-chloro phenol; aromatic hydrocarbons, such as benzene, toluene, xylene, methoxybenzene, and 1,2-dimethoxy benzene; acetone, ethyl acetate, tert-butyl alcohol, glycerol, ethylene glycol, triethylene glycol, ethylene glycol monomethyl ether, diethylene glycol dimethyl ether, ethyl cellosolve, butyl cellosolve, 2-pyrolidone, N-methyl-2-pyrrolidone, pyridine, triethylamine, tetrahydrofuran, dimethylformamide, dimethylacetamide, dimethyl sulfoxide, acetonitrile, butyronitrile, carbon disulfide. A concentration of the solution is suitably determined depending on solubility of the liquid crystal materials, and on a film thickness of a liquid crystal film finally required. It is usually in a range of 3 to 50% by weight, and preferably 7 to 30% by weight.

In addition, the liquid crystal material may include suitable additives. Furthermore, addition of chiral agents may give cholesteric liquid crystal materials.

A liquid crystal alignment layer obtained from the coated liquid crystal material has preferably a thickness of approximately 1 to 10 μm. Since a film thickness is almost determined in a stage of coating onto a transparent substrate film, a concentration of the solution, a thickness of the coated layer, etc. need an especially careful control, in the case where a film thickness of the liquid crystal layer needs to be especially precisely and accurately controlled.

As coating methods of the above described solution controlled to a desired concentration using the above described solvent, for example, a roll coating method, a photogravure coating method, a spin coating method, a bar coating method, etc. may be employable. Solvent is removed after coating and a liquid crystal layer is formed. Removing conditions of the solvents are not especially limited, if the solvent is removed in general and unless the liquid crystal layer does flow or fall. Usually, solvents are removed using drying at room temperature, drying by heating dryer, drying by heating on a hot plate, etc.

(Step (4))

In the step (4), after alignment of the liquid crystal material, the liquid crystal alignment layer is fixed. Thus, a liquid crystal alignment film in which the liquid crystal alignment layer is fixed is obtained.

In alignment of the liquid crystal material, a liquid crystal monomer and/or a liquid crystal polymer is aligned in a liquid crystal state. For example, heat treatment is given to the liquid crystal material to be in a liquid crystal temperature range, and then the liquid crystal material is aligned in a liquid crystal state. Heat treating method can be performed by the same method as drying method. A heat treatment temperature may not be simply determined because of dependency to kinds of a substrate film and of liquid crystal material to be used, and it is usually in a range of 60 to 300° C., and preferably in a range of 70 to 200° C. Furthermore, a heat treatment period may not simply be determined because of dependency over heat treatment temperatures, kinds of liquid crystal material and substrate film to be used, and it is usually in a range of 10 seconds to 30 minutes, and preferably in a range of 30 seconds to 15 minutes. On one hand, the heat treatment period shorter than 10 seconds may not fully progress alignment formation, and on the other hand the heat treatment period longer than 30 minutes may worsen mass production efficiency.

As to methods of fixing of the aligned liquid crystal material, a method of carrying out polymerization curing may be adopted when the liquid crystal material includes liquid crystal monomers. Various methods may be adopted according to kinds of the liquid crystal monomer for the polymerization curing, and, for example, a photo polymerization method by means of light irradiation may be adopted. Polymerization curing by means of light irradiation may preferably be adopted. By polymerization curing, the liquid crystal monomer is polymerized or cross-linked and thus fixed, and a film with high durability may be obtained. The light irradiation, for example, is performed by UV irradiation. In order to fully promote the reaction, UV irradiation is preferably performed in an inert gas atmosphere. Usually, a high pressure mercury ultraviolet lamp having an illuminance of approximately 80 to 300 $mW/cm^2$ may be used. Other kind lamps, such as meta-halide UV lamps and incandescence pipes, may also be used. Moreover, cooling processing using a cold mirror method, and water-cooling and other methods, or velocity adjustment of line speed so that a surface temperature of the liquid crystal layer at the time of UV irradiation may be within a liquid crystal temperature suitably controls temperature.

When the liquid crystal material does not include a liquid crystal monomer, but includes only a liquid crystal polymer, a liquid crystal alignment layer is cooled at a temperature of not more than a liquid crystal temperature, and thus the layer is fixed.

A liquid crystal alignment film comprising the above described liquid crystal alignment layer may be used with the above described substrate film, and it may be separated from the substrate film to be used independently as an optical film. Furthermore, it may be transferred to other optical films to be used with them. The above described liquid crystal alignment film may be independently used, or may be used in combination with other films as optical films, such as retardation plates, viewing angle compensating films, optical compensating films, and elliptically polarized light films. Detailed description about them will be given hereinafter.

A polarizing plate is used as an optical film applied to visual displays, such as liquid crystal displays. The polarizing plate usually has protective film(s) on one side or both sides of a polarizer. A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a material forming the protective film prepared in one side or both sides of the above-mentioned polarizer, with outstanding transparency, mechanical strength, heat stability, moisture cover property, isotropy, etc. may be preferable. As materials of the above-mentioned protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. In addition, a film comprising resins of heat curing type or ultraviolet curing type, such as acrylics type, urethane type, acrylics urethane type and epoxy type and silicone type may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

As a transparent protection film, if polarization property and durability are taken into consideration, especially triacetyl cellulose film in which a surface is saponified with alkaline is suitable. In general, a thickness of the transparent protection film, which can be determined arbitrarily, is 500 μm or less, preferably 1 to 300 μm, especially 5 to 300 μm in viewpoint of thin polarizing plate. In addition, when transparent protection films are provided on both sides of the polarizer, transparent protection films comprising different polymer material may be used on both of a front side and a back side.

Moreover, it is preferable that the transparent protection film may have as little coloring as possible. Accordingly, a protection film having a retardation value in a film thickness direction represented by $Rth=[(nx+ny)/2-nz]\times d$ of −90 nm to +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protection film may mostly be cancelled using a protection film having a retardation value (Rth) of −90 nm to +75 nm in a thickness direction. The retardation value (Rth) in a thickness direction is preferably −80 nm to +60 nm, and especially preferably −70 nm to +45 nm.

The above described polarizer and the protective film are usually adhered through aqueous adhesives etc. As aqueous adhesives, polyvinyl alcohol based adhesives, gelatin based adhesives, vinyl based latex based, and aqueous polyurethanes, aqueous polyesters, etc. may be illustrated.

As to the above-mentioned protective film, a film with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the transparent protective layer.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned.

Moreover, a retardation plate is used as an wide visual field angle polarizing plate in which it is laminated to a polarizing plate as a viewing angle compensating film. A viewing angle compensation film is a film for extending viewing angle so that a picture may look comparatively clearly, even when it is viewed from an oblique direction not from vertical direction to a screen.

As such a viewing angle compensation retardation plate, in addition, bi-directionally stretched films, such as films having birefringence in which biaxial-stretching processing or stretching processing in two perpendicularly intersecting directions etc. is given, and inclined-stretched film etc. may be used for others. As inclined alignment film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. Viewing angle compensation films may be suitably combinable for the purpose of inhibition of coloring by variation of viewing angle based on retardation by a liquid crystal cell etc. and of expanding of viewing angle for satisfactory visual recognition.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

A optical layer used in practical use is especially no limitation, one layer or two layers or more of optical layers, which may be used for formation of a liquid crystal display etc., such as a reflective plate, and a transflective plate, may be used. Especially preferable polarizing plates are; a reflection type polarizing plate or a transflective type polarizing plate in which a reflective plate or a transflective reflective plate is further laminated onto a polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an oriented film of cholesteric liquid-crystal polymer; a film that has the characteristics of reflecting a circularly polarized light with either left-handed or right-handed rotation and transmitting other light, such as a film on which the oriented cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

The above described elliptical polarizing plates and reflection type elliptical polarizing plate may be obtained by laminating a polarizing plate or a reflection type polarizing plate to a retardation plate in proper combination. This elliptical polarizing plate etc. may be formed by sequentially and separately laminating a polarizing plate (reflected type) and a retardation plate in a production process of a liquid crystal display so that they may give a proper combination, an optical film beforehand laminated and constituted as an elliptical polarizing plate etc. is superior in stability of quality, and laminating workability, etc., to demonstrate advantage in improved production efficiency of liquid crystal displays.

Pressure-sensitive adhesive layer may also be provided in an optical film of the present invention. Pressure-sensitive adhesive layer may be used for attachment to a liquid crystal cell, and also it may be used for laminating of an optical film. On the occasion of adhesion of the above described optical film, the optical axes may be set so that a proper arrangement angle may be given according to required retardation characteristics.

As pressure-sensitive-adhesive that forms pressure-sensitive adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, pressure-sensitive adhesive layer with low moisture absorption and excellent heat resistance is desirable. This is because those characteristics are required in order to prevent foaming and releasing-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, and fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive-adhesive layer to one side or both sides of the optical film. As an example, about 10 to 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a optical film top using suitable developing methods, such as flow method and coating method, or a method in which a pressure-sensitive adhesive layer is once formed on a separator, as mentioned above, and is then transferred on a polarizing plate or an optical film may be mentioned.

A pressure-sensitive adhesive layer may also be prepared on one side or both sides of a polarizing plate or an optical film as a layer in which pressure-sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of pressure-sensitive adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and a pressure-sensitive adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipments, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLE

Although the present invention will, hereinafter, be described with reference to Examples, the present invention is not limited by these Examples.

<Preparation of Coating Solution of Liquid Crystal Material>

Prepared was a solution including 10 g of a liquid crystal monomer showing a nematic liquid crystal phase (manufactured by BASF Ltd., Paliocolor LC242) and 3 g (to a polymerizable liquid crystal compound) of photo polymerization initiators (manufactured by Ciba Specialty Chemicals Co., Irgacure 907) both dissolved in toluene 40 g.

<Release Force>

A surface protective sheet (150 mm×50 mm) was laminated to a triacetyl cellulose film, and then the laminated material was left for 20 minutes at 23° C. The surface protective sheet was peeled at a speed of 300 mm/min by 180-degree peel, and a force (N/50 mm) was measured using a tensile testing machine (made by ORIENTEC Co., LTD, Tensilon).

<Evaluation of Electrified State>

Figure 2:
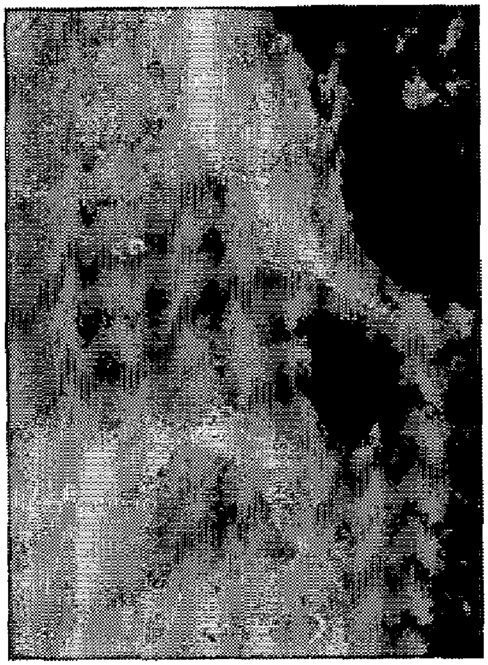
FIG. 2 shows a photograph concerning color distribution of attached toner showing electrified state in Comparative Example 2.

Apart from a case where the liquid crystal alignment film is obtained, an electrified state immediately after a surface protective sheet was peeled from a transparent substrate film was evaluated. Immediately after releasing of the surface protective sheet from the transparent substrate film, a positively charged blue toner and negatively charged red toner were sprinkled onto the transparent substrate film face. Toners that failed to attach were removed and a distribution state of the color of the attached toner was evaluated by visual inspection. Uniform negative charged on a surface might be identified by deposition of only the blue toner, and uniform positive charged on a surface might be identified by deposition of only the red toner. Mixed deposition of the red toner and the blue toner suggests that electrified state on the surface was uneven. FIG. 1 shows a photograph representing distribution of the color of the attached toner for judgment in Example 1, and FIG. 2 shows a photograph in Comparative Example 2.

Example 1

Immediately after a surface of a triacetyl cellulose film was aligned by rubbing using a rayon cloth, a surface protective sheet having a release force of 0.05 N/50 mm was laminated. As a surface protective sheet, 6221F manufactured by Sekisui Chemical Co., Ltd. was used. The protective sheet was manufactured by co-extrusion of a base material layer (50 μm in thickness, polyethylene) as a surface protective sheet, and a pressure-sensitive adhesive layer (ethylene-vinyl acetate copolymer). Subsequently, the surface protective sheet was peeled (by 180-degree peel) immediately before coating of a coating solution of a liquid crystal material, and then the coating solution was coated onto the aligned face using a wire bar of #10. After alignment of the liquid crystal material by drying for 5 minutes at 90° C., the liquid crystal layer was cured by irradiation with a light of 1 mJ/cm$^2$ using a metal halide lamp to obtain a liquid crystal alignment film having a thickness of 2 μm.

Example 2

Except for having used a surface protective sheet having a release force of 0.1 N/50 mm as a surface protective sheet in Example 1, a same method as in Example 1 was repeated to obtain a liquid crystal alignment film. A surface protective sheet used was SUNITECT PAC3 manufactured by SUN A KAKEN Co., LTD. The protective sheet was manufactured by co-extrusion of a base material layer (60 μm in thickness, polyethylene) as a surface protective sheet, and a pressure-sensitive adhesive layer (ethylene-vinyl acetate copolymer).

Example 3

Except for having used a surface protective sheet having a release force of 0.3 N/50 mm as a surface protective sheet in Example 1, a same method as in Example 1 was repeated to obtain a liquid crystal alignment film.

Comparative Example 1

Except for not having used a surface protective sheet in Example 1, a same method as in Example 1 was repeated to obtain a liquid crystal alignment film. In Comparative Example 1, close contact between the triacetyl cellulose film and the roll was observed.

Comparative Example 2

Except for having used a surface protective sheet having a release force of 1.5 N/50 mm as a surface protective sheet in Example 1, a same method as in Example 1 was repeated to obtain a liquid crystal alignment film. Y-16F manufactured by SUN A KAKEN Co., LTD. was used as a surface protective sheet.

Comparative Example 3

Except for having used a surface protective sheet having a release force of 1.0 N/50 mm as a surface protective sheet in Example 1, a same method as in Example 1 was repeated to obtain a liquid crystal alignment film. As a surface protective sheet, E-MASK manufactured by NITTO DENKO CORPORATION. was used.

Following evaluations were performed to the liquid crystal alignment films obtained by Examples and Comparative Examples. Table 1 shows results.

(Alignment)

Two polarizing plates manufactured by NITTO DENKO CORPORATION (SEG 1425 DU) were prepared. They were disposed in a mutually perpendicular state, and between them the liquid crystal alignment films (retardation plate) manufactured as described above were disposed so that a direction of rubbing may be parallel to absorption axis (or transmission axis) of the one polarizing plate. Transmittance Y (%) of samples obtained was measured for using DOT-3 made by MURAKAMI COLOR RESEARCH LABORATORY. Disorder in rubbing alignment angles raises transmittance, showing degradation in alignment. A transmittance of 0.1% or less allows judgment that the liquid crystal is in a state of uniform alignment in a direction of rubbing, and this state was to be satisfactory and other states was determined to be poor.

TABLE 1

| | Surface protective sheet | | | Alignment | |
|---|---|---|---|---|---|
| | With or without | Release force (N/50 mm) | Electrified state | Transmittance (%) | Judgment |
| Example 1 | With | 0.05 | Only blue toner attached/ negatively charged | 0.05 | Satisfactory |
| Example 2 | With | 0.1 | Only blue toner attached/ negatively charged | 0.07 | Satisfactory |
| Example 3 | With | 0.3 | Only blue toner attached/ negatively charged | 0.06 | Satisfactory |
| Comparative Example 1 | without | — | Mixed attachment of red toner and blue toner/ uneven electrification | 0.25 | Poor |
| Comparative Example 2 | With | 1.5 | Mixed attachment of red toner and blue toner/ uneven electrification | 1.24 | Poor |
| Comparative Example 3 | With | 1.0 | Mixed attachment of red toner and blue toner/ uneven electrification | 1.86 | Poor |

What is claimed is:

1. A method for manufacturing liquid crystal alignment film comprising the steps of:

(1) aligning a transparent substrate film by rubbing;

(2) laminating a surface protective sheet having a release force of 0.5 N/50 mm or less onto an aligned face of the transparent substrate film;

(3) coating a liquid crystal material comprising a liquid crystal monomer and/or a liquid crystal polymer onto the aligned face after releasing the surface protective sheet; and (4) fixing the liquid crystal material after aligning the liquid crystal material, and wherein the transparent substrate film is uniformly charged either positive or negative at the time of releasing the surface protective sheet in the step (3).

2. The method for manufacturing liquid crystal alignment film according to claim 1, wherein the surface protective sheet comprises a base material layer and a pressure-sensitive adhesive layer, and the surface protective sheet is manufactured by co-extrusion of the pressure-sensitive adhesive layer and the base material layer or by coating the pressure-sensitive adhesive layer to the base material layer.

3. The method for manufacturing liquid crystal alignment film according to claim 2, wherein the base material layer comprises an olefin based resin, and the pressure-sensitive adhesive layer comprised an ethylene-vinyl acetate copolymer.

* * * * *

UNITED STATES PATENT AND TRADEMARK OFFICE

CERTIFICATE OF CORRECTION

PATENT NO. : 7,604,847 B2
APPLICATION NO. : 11/193378
DATED : October 20, 2009
INVENTOR(S) : Kawamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 781 days.

Signed and Sealed this

Fifth Day of October, 2010

David J. Kappos
*Director of the United States Patent and Trademark Office*